United States Patent [19]
Duddey et al.

[11] Patent Number: 5,343,916
[45] Date of Patent: Sep. 6, 1994

[54] NON-PNEUMATIC SPARE TIRE

[75] Inventors: James E. Duddey, Akron; John M. Cady, Munroe Falls, both of Ohio

[73] Assignee: The Goodyear Tire & Rubber Company, Akron, Ohio

[21] Appl. No.: 978,617

[22] Filed: Nov. 19, 1992

Related U.S. Application Data

[63] Continuation of Ser. No. 661,158, Feb. 27, 1991, abandoned.

[51] Int. Cl.$^5$ .............................................. B60C 7/10
[52] U.S. Cl. ...................................... 152/5; 152/326; 152/7
[58] Field of Search ............ 152/209 R, 452, 323–329, 152/5

[56] References Cited

U.S. PATENT DOCUMENTS

| | | |
|---|---|---|
| 1,258,573 | 3/1918 | Johnstone . |
| 1,365,539 | 1/1921 | Pepple ................................ 152/326 |
| 1,441,654 | 1/1923 | Austin . |
| 1,493,923 | 5/1924 | Deister . |
| 1,494,797 | 5/1924 | Nimschke . |
| 1,524,718 | 2/1925 | Leach . |
| 1,670,827 | 5/1928 | Seiberling . |
| 1,702,081 | 2/1929 | Hatfield ................................ 152/326 |
| 2,603,267 | 7/1952 | Simpson ................................ 152/7 |
| 2,620,845 | 12/1952 | Lord ................................ 152/328 |
| 2,742,941 | 4/1956 | Johnson ................................ 152/326 |
| 3,188,775 | 6/1965 | Cosmos ................................ 51/141 |
| 3,470,933 | 10/1969 | Molnar ................................ 152/330 |
| 3,901,300 | 8/1975 | Toplis . |
| 4,071,070 | 1/1978 | Schmidt . |
| 4,168,771 | 9/1979 | Krivec . |
| 4,169,494 | 10/1979 | Kubica et al. . |
| 4,226,273 | 10/1980 | Long et al. . |
| 4,235,270 | 11/1980 | Kahaner et al. . |
| 4,287,927 | 9/1981 | Caravito et al. . |
| 4,345,633 | 8/1982 | Gilmore ................................ 152/328 |
| 4,549,592 | 10/1985 | Schroder . |
| 4,921,029 | 5/1990 | Palinkas et al. ................................ 152/11 |
| 4,934,425 | 6/1990 | Gajewski et al. ................................ 152/323 |
| 4,945,962 | 8/1990 | Pajtas ................................ 152/7 |

FOREIGN PATENT DOCUMENTS

| | | |
|---|---|---|
| 0159888 | 10/1985 | European Pat. Off. . |
| 0401564 | 12/1990 | European Pat. Off. . |
| 1680407 | 12/1970 | Fed. Rep. of Germany . |
| 2460051 | 7/1976 | Fed. Rep. of Germany . |
| 0005612 | 3/1906 | France ................................ 152/536 |
| 2179503 | 7/1990 | Japan . |
| 8905736 | 6/1989 | PCT Int'l Appl. . |
| 0008884 | of 1893 | United Kingdom ................ 152/536 |
| 0006361 | of 1906 | United Kingdom ................ 152/536 |
| 0241090 | 10/1925 | United Kingdom . |
| 0601764 | 5/1948 | United Kingdom . |

OTHER PUBLICATIONS

"Polyurthane Non–Pneumatic Tire Technology"; S. Pajtas; SAE Techanical Paper Series #900763; Mar. 1990.

"New Rule for Non-Pneumatics?" by Miles Moore RPN Staff, Rubber Plastics News II, Apr. 24, 1987.

"Polyurethane non-pneumatic spare tire" by Scott Pajtas, The Uniroyal Goodrich Tire Company, Automotive Polymers Design.

Primary Examiner—Michael W. Ball
Assistant Examiner—Nancy T. Krawczyk
Attorney, Agent, or Firm—David L. King

[57] ABSTRACT

An improved nonpneumatic tire for a motor vehicle is described. The tire has a rim and one or more elastomeric materials bonded to the rim or to one another. The tire has an equatorial plane, an annular tread rotatable about an axis, and an annular elastomeric body. The elastomeric body has at least 48 openings, a first set of at least 24 openings extend from the first side and a second set of at least 24 openings extend from a second side, both sets extending toward the equatorial plane. The openings form equally spaced columns. The columns formed by the first set of openings are inclined to the radial direction. The columns formed by the second set of openings are inclined opposite to the columns of the first set. The improved tire is characterized by columns having cross sections equidistant from the equatorial plane. The cross section of each of the columns increases in thickness from a minimum to maximums at the radially inner and radially outer extremes of the column.

21 Claims, 12 Drawing Sheets

NON-PNEUMATIC SPARE TIRE

This is a continuation of application Ser. No. 661,158 filed Feb. 27, 1991, now abandoned.

BACKGROUND OF THE INVENTION

This invention relates to an improved nonpneumatic tire which will be used primarily as a temporary spare tire. The improved tire is designed to replace the conventional pneumatic spare tire.

Nonpneumatic tires are old in the art. Nonpneumatic solid rubber tires were in use prior to pneumatic tires. As vehicle speeds increased and ride characteristics became more important the need for a better tire structure emerged. The invention of the pneumatic tire provided a solution to the problems and limitations of solid tires.

The pneumatic tire is an efficient structure that has endured as a solution to conventional vehicle requirements.

A pneumatic tire is a "tensile structure". Tensile structures always contain a compression member for providing a tensile preload in the tensile member. The tensile member can usually accept no compression and the compression member no tension. In pneumatic tires the cords are the tensile member and the compressed air is the compression member.

The primary drawback of a pneumatic tire is that it is pneumatic. Air contained under pressure can and usually does escape at the most inopportune times at least from the driver's view point. It is aggravating to find that the spare tire which has been lugged around in the trunk for years is also flat.

The present invention has no air under pressure. It is a tire structure that performs similarly to a pneumatic tire without requiring air contained under pressure.

Communication of the tire with the road in the area of the footprint or road contact patch provides the only force input to the vehicle and provides the handling forces as well as load support. A nonpneumatic tire must be designed with these characteristics fundamental to a pneumatic tire in mind. A pneumatic tire has unique flexure and load carrying characteristics. Shock and deflections although occurring locally in the area radially inwardly of the footprint are absorbed globally by the entire tire structure. Cornering characteristics are achieved by a combination of sidewall increases and decreases in tension.

A nonpneumatic tire must be able to withstand shock loads and dissipate the energy absorbed. Unlike the pneumatic tire, the nonpneumatic tire generally absorbs shocks and deflects locally in the area within the footprint or contact patch. The tire being capable of localized deflection must exhibit high dampening characteristics.

The tire in a running condition must be able to dissipate heat. The nature of dampening loads is a form of energy dissipation. Energy absorbed is converted to heat. Heat in turn can affect tire performance and can result in premature tire failure; efficient dissipation of heat is essential. Ideally, energy is only absorbed by the tire in the area radially inward of the footprint so that energy can be removed from such area during the remainder of the tire's revolution. Rubber is a poor conductor of heat.

The thicker the rubber the higher the heat buildup. The heat buildup problem can be reduced to a controlled level by having thin material cross sections with high air circulation.

Urethane tires can operate at temperatures as high as about 93° C. (200 degrees F.). Temperatures higher than 121° C. (250 degrees F.) degrees for prolonged periods will cause a weakening of the structure. If the temperature of the tire is high enough this can lead to premature failure.

In 1917 a nonpneumatic tire called automobile cushion wheel was patented by Samuel Johnstone. The U.S. Pat. No. 1,258,573 describes a multicomponent wheel. The Johnstone wheel comprises a central portion of resilient material, an outer resilient tread portion, and an interposed shock absorbing portion comprising a plurality of crossed webs of resilient material formed with the center and tread portions. Formed in the inner portion of the shock absorbing portion is an annular series of orifices. The orifices were set transversely and slightly overlapping. Each orifice extended across the entire axial width of the shock absorbing portion. A pair of disks were also provided with similar orifices. One disk was positioned on each side of the wheel with orifices aligned with those of the shock absorbing portion. Upon molding one integral unit was formed. The cushion wheel so described was claimed to be of no greater weight than metal or wooden wheels of that era. The tire further eliminated the metal parts used to fasten pneumatic or solid rubber tires to the wooden felly.

In 1923, Louis Ninskle was granted U.S. Pat. No. 1,494,797 for a tire. The invention described a rubber tire with encapsulated air recesses or compartments. The cushioning of the tire was achieved through the use of entrapped air.

These earlier attempts to develop a nonpneumatic tire failed to provide good heat dissipation. As vehicle speeds increased, these concepts were incapable of meeting the needs of the day and simply died out.

In 1989, a patent issued for a nonpneumatic tire suitable for use on vehicles of the current era. The nonpneumatic tire is described in the Palinkos, et al. U.S. Pat. No. 4,832,098. The tire is integrally molded from an elastomeric material to form a unitary structure comprising inner and outer "hoops". The outer hoop is supported and cushioned by a plurality of circumferentially spaced apart planar rib members (ribs) and a planar central web member (web) which connects the hoops at their circumferential centering. The web lies in a plane perpendicular to the rotational axis of the tire. The ribs extend axially along the inner and outer hoops connecting them and the edges of the rib lie along the opposite faces of the web. The planar ribs are undercut at the radial extremes to insure that bending is assured and the ribs buckle only when a critical load is exceeded.

The Palinkas, et al. design requires the use of oppositely directed ribs connected to a central planar web and inner and outer hoops. It is this combination of load bearing that is claimed to provide "ride" and handling characteristics of a pneumatic tire.

The applicants' tire described herein, and subject of this invention is an improvement in nonpneumatic tire design.

SUMMARY OF THE INVENTION

This invention relates to an improved nonpneumatic tire of the type having a rim and one or more elastomeric materials bonded to the rim or to one another.

The tire has an equatorial plane, an axis perpendicular to the equatorial plane, an annular Tread rotatable about the axis, and an annular elastomeric body made from a material having a Shore A hardness in the range of 60 to 100. The body has first and second spaced lateral sides. The sides are spaced equidistant from the equatorial plane and extend between the tread and the rim. The body has at least 48 openings positioned equidistant from the axis, at least 24 of which extend from the first side and at least 24 of which extend from the second side to form first and second sets of openings. The sets of openings extend from respective sides toward the equatorial plane. The openings form equally spaced columns of elastomeric material in the body. The columns formed by the first set of openings are inclined to the radial direction of the tire, and the columns formed by the second set of openings are generally inclined to the radial direction of the tire, but are opposite in inclination with respect to the columns formed by the first set of openings.

The improved tire is characterized by the columns of the first and second sets having respective cross-sections equidistant from the equatorial plane. The cross-sections of the columns of the first set have a minimum thickness t1S1 located radially inwardly of the tread and radially outwardly of a radially innermost portion of the annular body. The thickness of the columns of the first set increases from the minimum thickness, t1S1 to a thickness t2S1 at a radially outermost portion of the columns of the first set. The thickness of the columns of the first set increases from the minimum thickness t1S1, to a thickness t3S1 at a radially innermost portion of the column. The ratio t2S1 to t1S1 and the ratio of t3S1 to t1S1 both are at least 150% in the cross-section.

The cross-sections of the columns of the second set have a minimum thickness t1S2 located radially inwardly of the tread and radially outwardly of a radially innermost portion of the body. The thickness of the columns of the second set increase from the minimum thickness t2S2 at a radially outermost portion of the columns of the second set. The thickness of the columns of the second set increase from the minimum thickness t1S2 to a thickness t3S2 at a radially innermost portion of the column. The ratio of t2S2 to t1S2 and the ratio of t3S2 to t1S2 both are at least 150% in the cross-section.

BRIEF DESCRIPTION OF THE DRAWINGS

FIG. 14 has the narrow end of the openings extending radially outwardly, FIG. 15 depicts the opening facing radially inwardly, and FIG. 16 depicts the openings alternating with the narrow end radially outwardly directed and one opening, and adjacent openings directed with the narrow end radially outwardly.

DETAILED DESCRIPTION OF THE PREFERRED EMBODIMENT

The invention also may be better understood in the context of the following definitions, which are applicable to both the specification and the appended claims.

"Axial" and "axially" are used herein to refer to lines or directions that are parallel to the axis of rotation of the tire.

"Elastomer" means a resilient material capable of recovering size and shape after deformation.

"Equatorial plane (EP)" means the plane perpendicular to the tire's axis of rotation and passing through the center of its tread.

"Footprint" means the contact patch or area of contact of the tire tread with a flat surface at zero speed and under normal load.

"Harshness" means the amount of disturbance transmitted by a tire when it passes over minor but continuous road irregularities.

"Hysteresis" means a retardation of the effect when forces acting upon a body are changed.

"Normal load" refers to the specific design load for the service condition for a tire.

"Pneumatic tire" means a laminated mechanical device of generally toroidal shape (usually an open-torus)

having beads and a tread and made of rubber, chemicals, fabric, and steel or other materials. When mounted on the wheel of a motor vehicle, the tire through its tread provides traction and contains the fluid that sustains the vehicle load.

"Radial" and "radially" are used to mean directions radially toward or away from the axis of rotation of the tire.

"Rim" means a support for a tire or a tire and tube assembly upon which the tire is secured.

"Spring rate" means the stiffness of tire expressed as the slope of the load defection curve.

"Tread" means a molded rubber component which, when bonded to a tire body, includes that portion of the tire that comes into contact with the road when the tire is under normal load.

Figure 1:
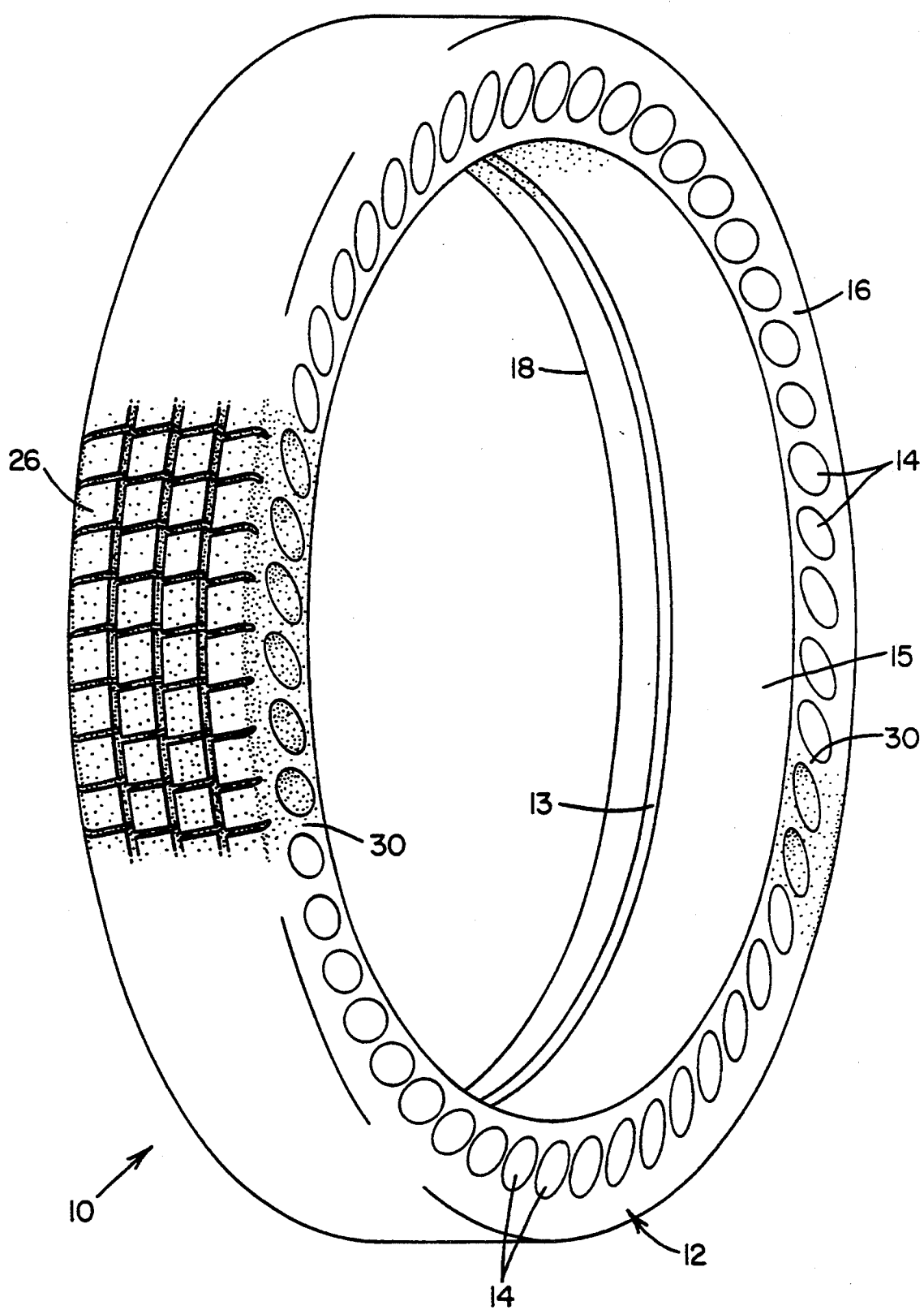
FIG. 1 illustrates an annular nonpneumatic tire of the invention without rim and is a 20.8 inch outside diameter, 3.5 inch section width, and 1235 lb load carrying tire illustrated at two-fifths scale.
Figure 2:
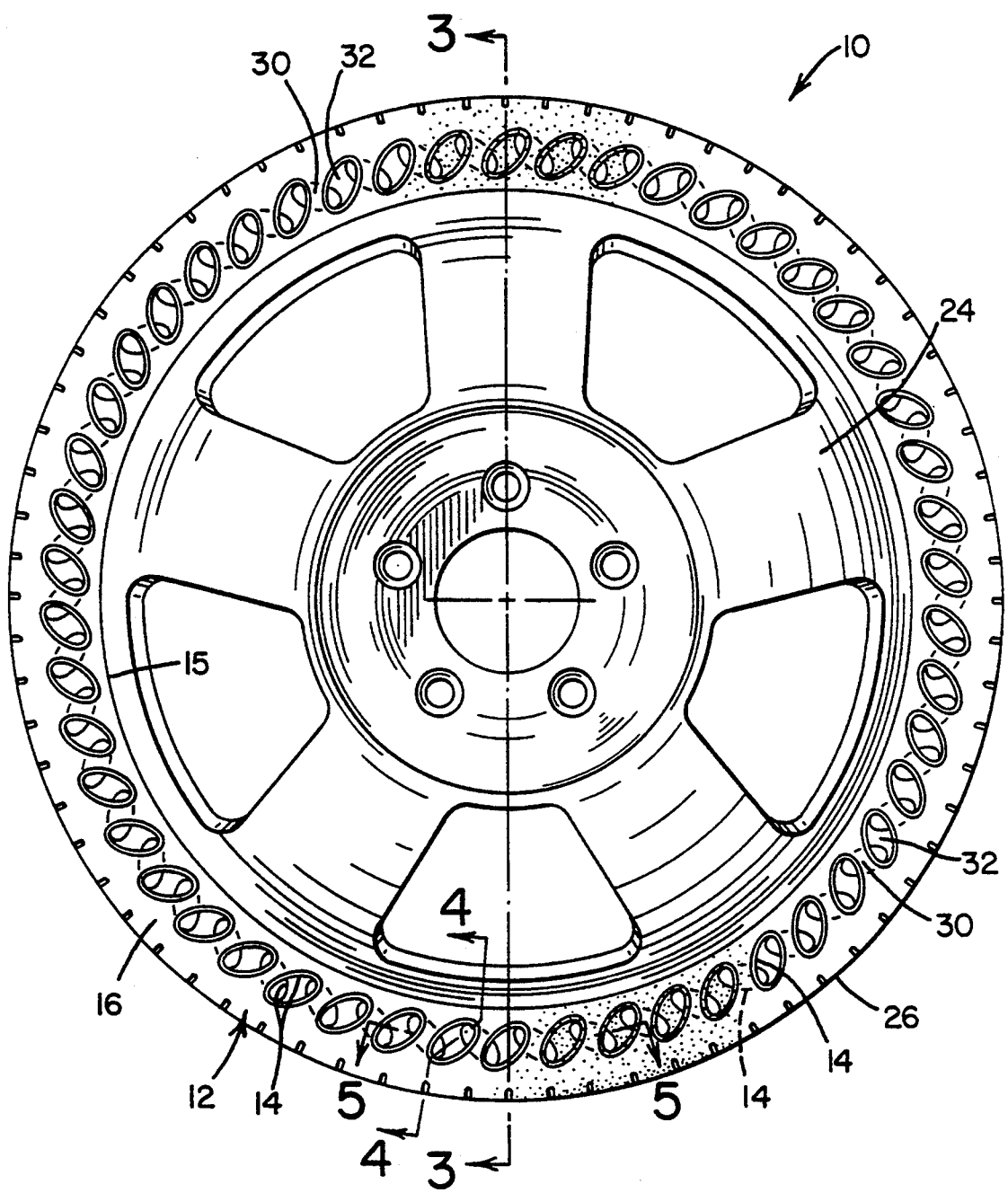
FIG. 2 illustrates a side view of the tire of FIG. 1 attached to or bonded to a rim.
Figure 3:
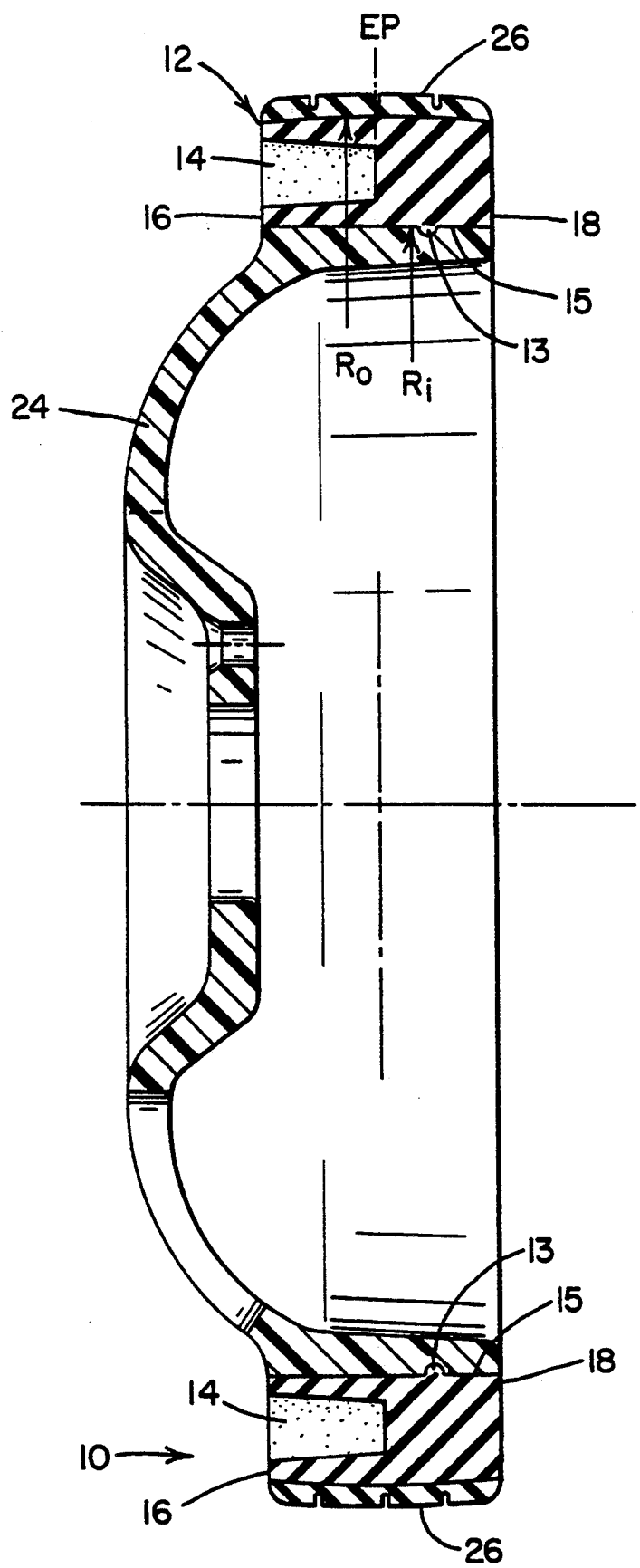
FIG. 3 is an enlarged cross-sectional view of the tire and rim taken along lines 3—3 of FIG. 2.

With reference to FIGS. 1–3, a tire shown generally at 10 is provided with an annular body shown generally at 12, which includes first and second sides 16,18 respectively. Each side is equidistant from the equatorial plane and extends radially inwardly from the tread 26. The body 12 as illustrated has 100 openings 14, positioned equidistant from the axis of rotation. Fifty of the openings 14 axially extend from the first side 16 and are of a first set. Fifty of the openings 14 axially extend from the second side 18 and are of a second set.

In FIG. 1, a "V" structure of the annular body 12 with tread 26 is illustrated without a rim. A circumferential rib 13 is integrally molded into the body 12 and extends radially inwardly of the inner surface 15 of the annular body 12. The rib 13 assists in fixing the annual body 12 to the rim.

In FIG. 2 an elevation view of the tire 10 including a rim 24 is illustrated. FIG. 2 further illustrates the openings 14 of the first set and the openings 14 from the second set form equally spaced columns (30,32). The columns 30 formed by the first set of openings are generally inclined to the radial direction of the tire, but are opposite in inclination with respect to the columns 32 formed by the second set of openings. The columns in their intersection form a "V".

As shown in FIG. 3, the rim 24 is radially inward of the annular body 12. The mating surfaces of the rim 24 and annular body 12 are adhesively joined. The rib 13 is interlocked with a circumferential groove in the rim. This mechanical rib 13 assists in locking the annular body to the rim 24.

Figure 4:
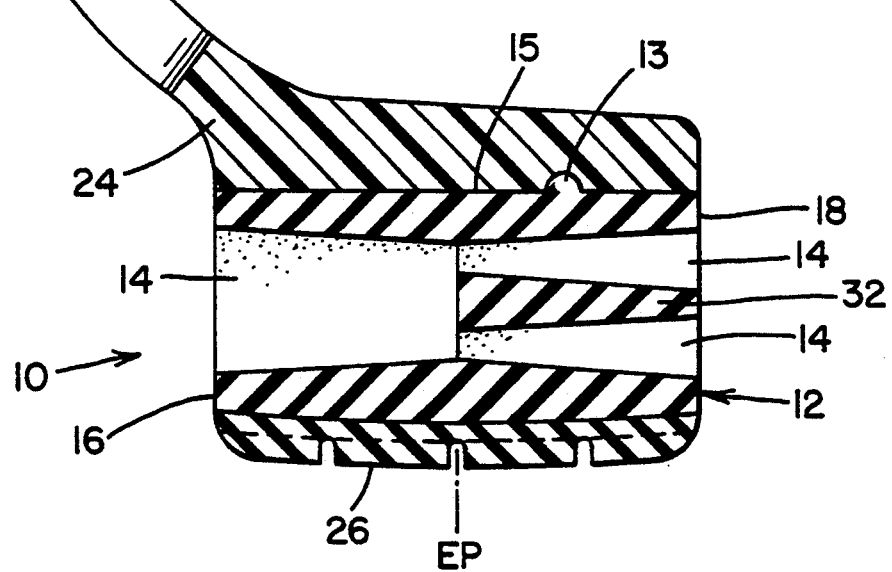
FIG. 4 is a further enlarged view of a cross-sectional portion of the tire and rim, the section being taken along the line 4—4 in FIG. 2.

A view of a portion of the tire 10 is illustrated in the enlarged view of FIG. 4, which depicts a column 32 extending from side 18 and terminating at the equatorial plane where the column meets an opening 14 extending from side 16.

Figure 5:
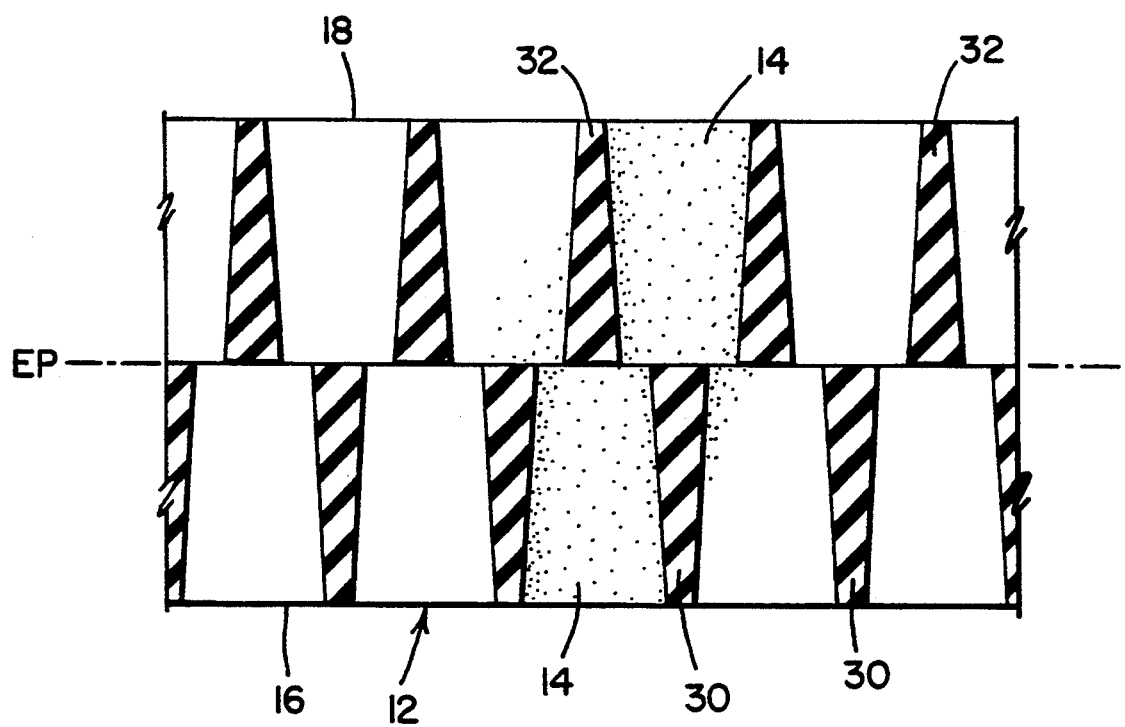
FIG. 5 is a cross-sectional view of the annular body of the tire taken along lines 5—5 of FIG. 2.

FIG. 5 is an enlarged view taken along line 5—5 FIG. 2. The view illustrates the opening 14 extending from one side communicating at the equatorial plane (EP) with a pair of openings 14 on the opposite side of the tire.

Figure 6:
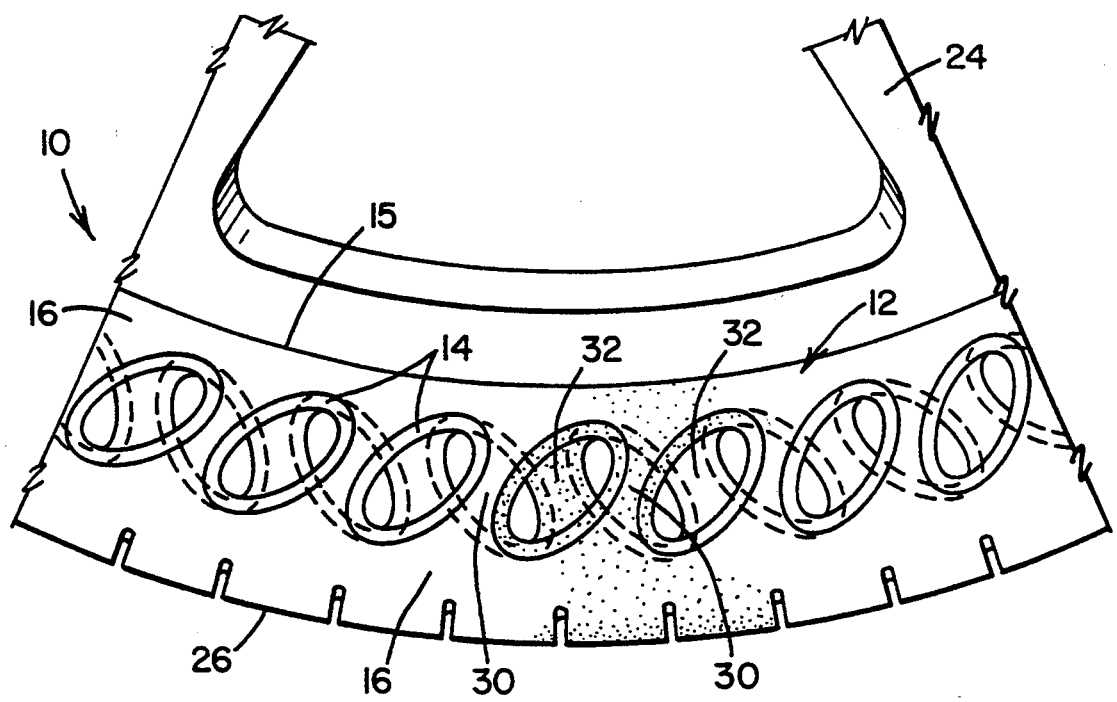
FIG. 6 is a side view of a portion of the tire and rim assembly unloaded.
Figure 7:
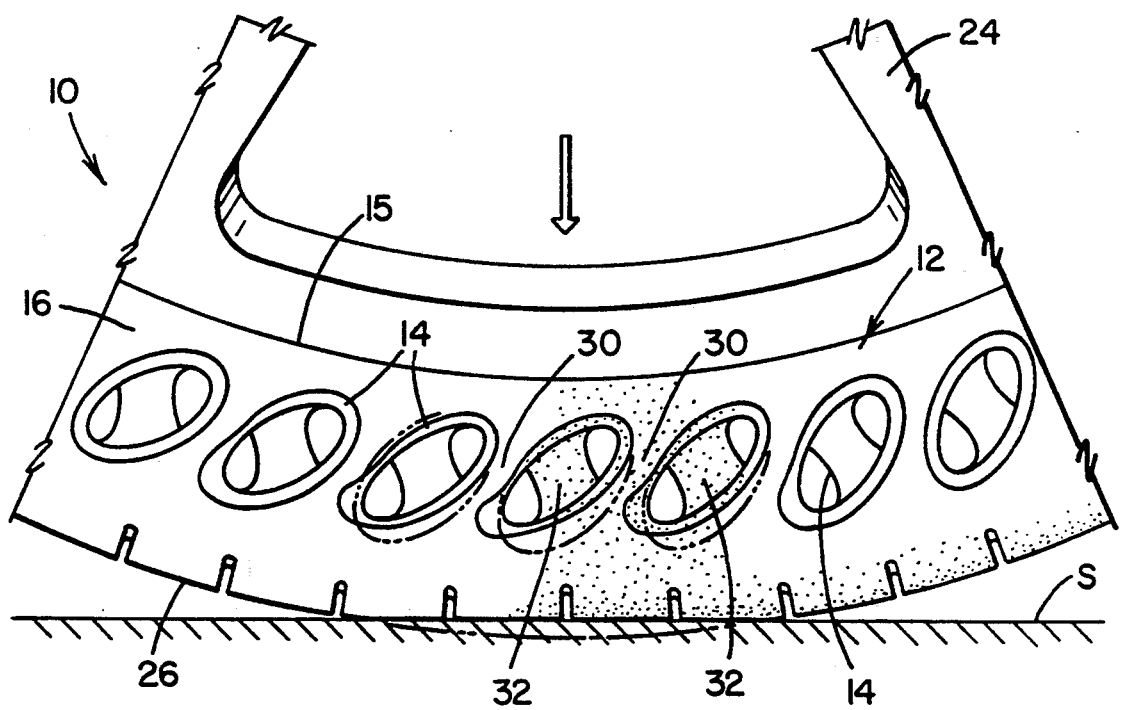
FIG. 7 is a side view of a portion of the tire and rim under a normal load illustrating the deflection of the tire.

FIG. 6 illustrates a portion of the unloaded tire 10 and FIG. 7 depict the tire 10 under a loaded condition. The views depict the first set of openings 14 extending from first side 16 toward the second set of openings 14, which extend from the second side 18. Each of the openings 14 of the first set communicate with a pair of openings 14 of the other set. The openings 14 of the second set are depicted by phantom lines. The openings 14 in each set are centered on the columns (30,32) formed by the openings 14 of the opposite set.

As can be observed from FIG. 7, the tire 10 under load compresses. The area in contact with the road surfaces defines a contact path or footprint. Radially inward of the contact path the annular body 12 is compressed as illustrated by the flattening of the openings 14. The unloaded shape of the openings 14 is depicted by broken lines.

Figure 8:
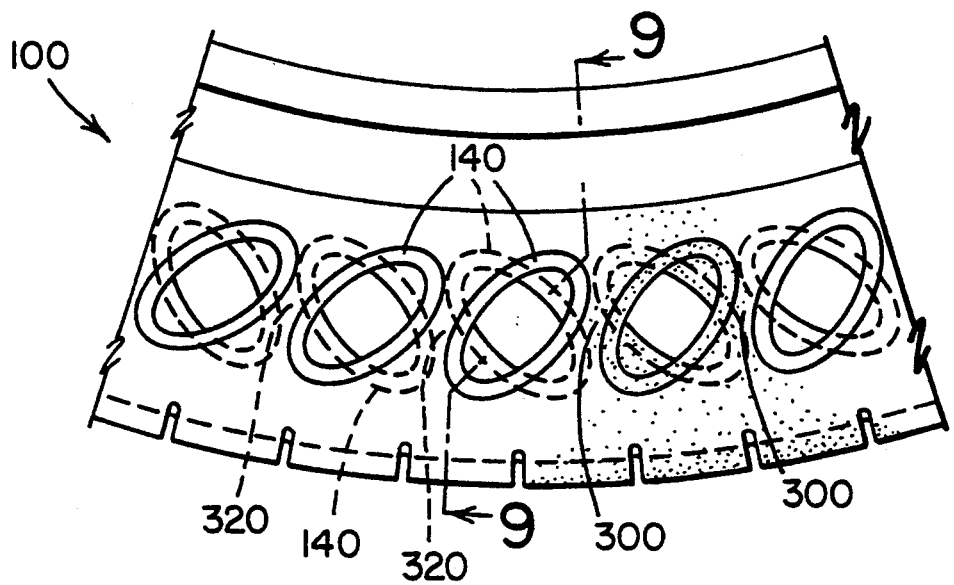
FIG. 8 is a side view of a portion of the tire and assembly, illustrating the openings of the first set and second set oppositely inclined with centers aligned.
Figure 9:
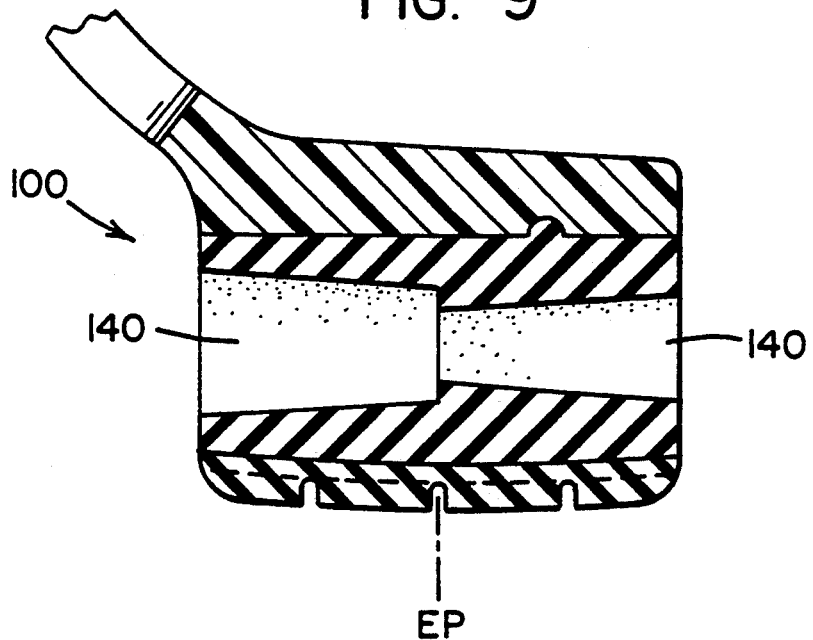
FIG. 9 is a cross-sectional view of the tire and rim assembly taken along lines 9—9 of FIG. 8.

FIG. 8 illustrates an alternative embodiment tire 100 wherein openings 140 of the first set are centered on oppositely inclined openings 140 of the second set. As shown in FIG. 9, the openings 140 of the first set communicate with the openings 140 of the second set at the equatorial plane (EP) of the tire. The columns formed by the opening are also aligned at the area where the columns exhibit minimum thickness. The configuration as illustrated creates an alignment of openings 140 or columns 300,320 in the shape of an X.

Figure 10:
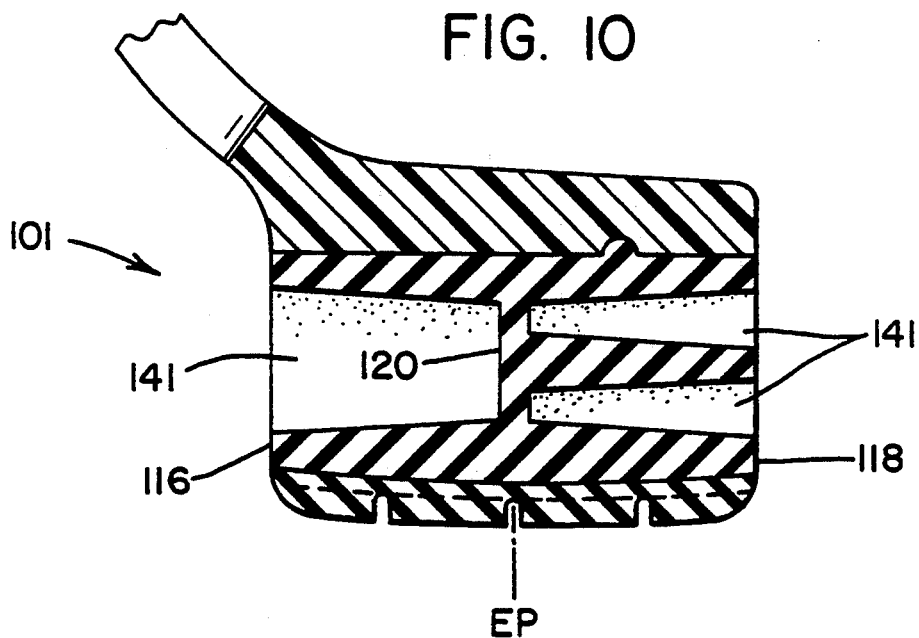
FIG. 10 is a cross-sectional view of a portion of the tire and rim assembly depicting an alternative embodiment.

In FIG. 10 a third embodiment 101 is illustrated. This is a cross section similar to that shown in FIG. 4, but the first set of openings 141 extending from the first side 116 of the tire do not communicate with those extending from the second side 118 of the tire. Otherwise stated the openings 141 of the first set and the second set do not extend to the equatorial plane (EP) and there is no direct communication between openings 141 of opposite sets. Thus, a reinforcing web 120 is formed at the equatorial plane. If desired, the reinforcing web can be thicker or thinner to control its stiffness and may include small openings interconnecting the larger openings 141 of the opposite sets.

Although the openings are illustrated extending axially to the equatorial plane or symmetrically equidistant from the equatorial plane, openings may extend non-equidistantly relative to the equatorial plane. In such a case the openings of one set may extend axially a distance different from the openings of the opposite set and the columns formed by both sets would not be equally spaced from the equatorial plane.

The columns formed by the first set of openings intersect the columns formed by the second set of openings at locations other than at the equatorial plane of the tire.

Figure 11:
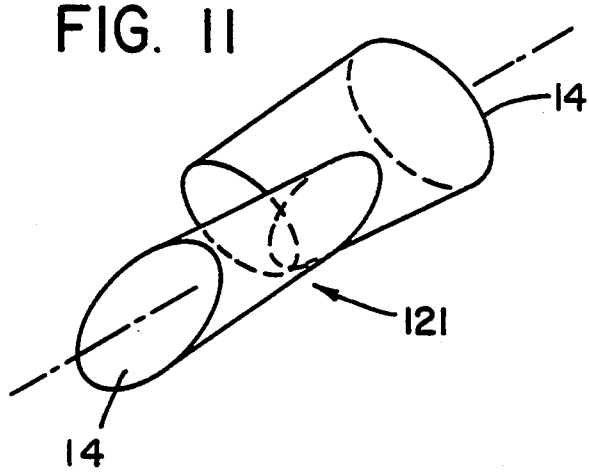
FIG. 11 is a perspective view illustrating the pair of openings overlaid and communicating at a radial extreme.
Figure 12:
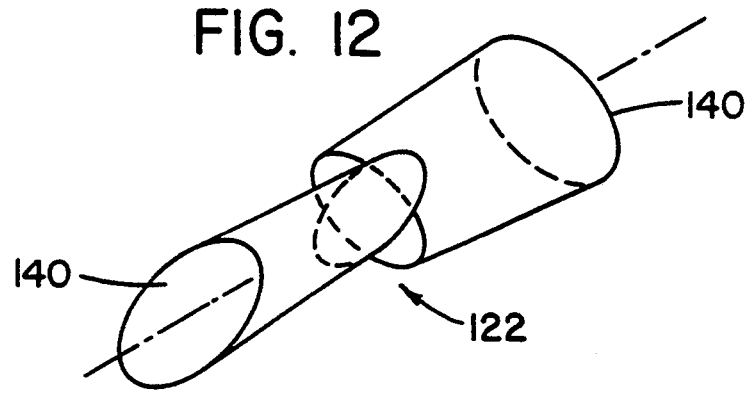
FIG. 12 is a perspective view of a pair of openings overlaid and communicating at centers.

In the perspective view of FIG. 11 an opening 14 of the first set and an opening 14 of the second set are illustrated. In each figure, the openings of the first set intersect and communicate with the openings of the second set. In FIG. 11, the communication occurs at the extremes of the openings 14 forming a "V" shape intersection. In FIG. 12, the openings 140 intersect at their centers, forming an "X" shape intersection.

In the molding of the annular body of the tire, the first set of openings are formed by projections located in one half of the mold, and openings of the second set are formed by projections in the other half of the mold. A mold actually used was constructed such that one half of the mold could be rotated relative to the other half. This enabled the body to be produced as illustrated in FIG. 11 or as illustrated in FIG. 12. The relative movement permits a full range of orientations to be manufactured by simply rotating one half of the tooling relative to the other half and then locking the mold halves in place. This relative movement of mold halves enables an orientation of openings of first and second sets when overlaid to resemble a "V" configuration as shown in FIGS. 1–7, and 11, which is the currently preferred embodiment. Alternatively, an "X" configuration as illustrated in FIGS. 8, 9, 12, and 19, or any other relative orientation between the "X" or "V" configurations is feasible by selective rotation of one mold half relative to the other mold half.

Figure 13:
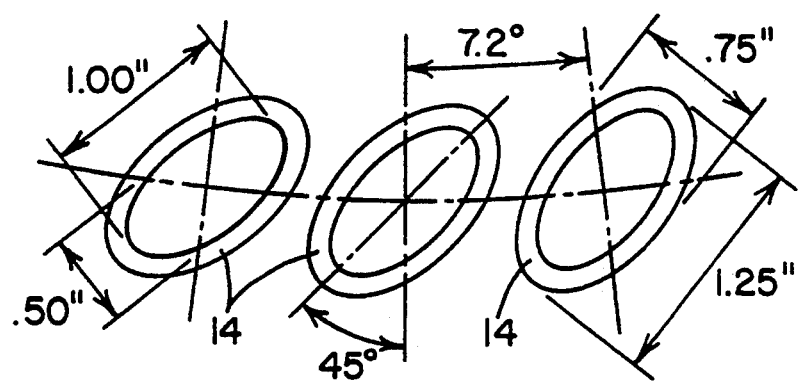
FIG. 13 is a view illustrating a geometric spacing, size, and orientation of three adjacent openings of a set.

FIG. 13 is a view illustrating a geometric spacing, size and orientation of three adjacent openings 14 of a set. In the view, the openings are elliptical in shape and are inclined at a 45° angle with respect to a radial plane passing through the axis of rotation of the tire. The openings taper inwardly and have a maximum size at a side of the tire and a minimum size at the equatorial plane EP. The openings shown are for a 52.8 cm (20.8 in) O.D. tire. At the larger end of each opening, its elliptical shape has a major axis of 3.2 cm (1.25 inch) and a minor axis of 0.75 inch. At the smaller end at the equatorial plane, the major axis is 2.5 cm (1.00 inch) and the minor axis is 1.25 cm (1.00 inch). The centers of the openings are spaced angularly at 7.2° relative to centers of adjacent openings. The embodiment depicted corresponds to a tire having 50 openings on each side of the tire.

Figure 14:
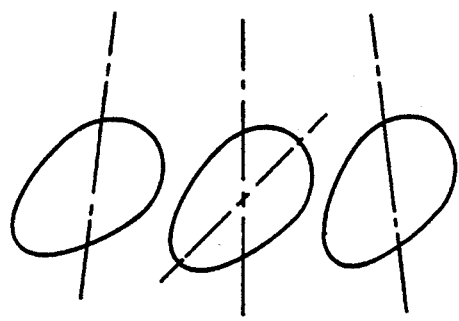
FIGS. 14, 15, and 16 illustrate a geometric spacing of three adjacent ovate openings of a set of an alternative embodiment of the tire.
Figure 15:
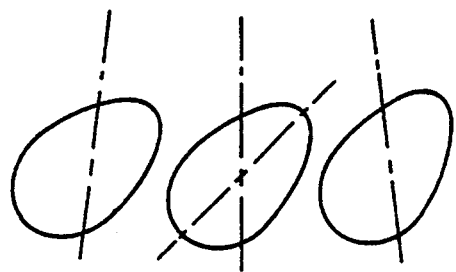
Figure 16:

FIGS. 14, 15, and 16 depict alternative openings of ovate shape that could be utilized in the annular body. FIG. 14 has the narrow end of the irregular ovate shape radially in; FIG. 15 has the narrow end radially out with respect to the axis and rotation; and FIG. 16 alternates the narrow end from radially out to in.

Figure 17:
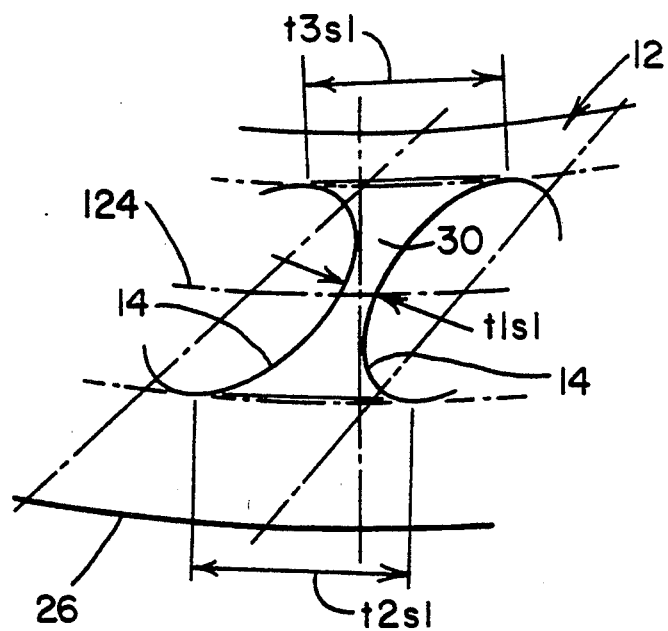
FIG. 17 is a schematic side view of the columns of the first set.

With regard to FIG. 17, a side view of some of the columns 30 formed by openings 14 of the first set in the embodiment of FIG. 2–7 is illustrated. The column 30 has a minimum cross-sectional thickness $t1s1$ located radially inwardly of the tread 26 and radially outwardly of a radially innermost portion of the annular body 12. The thickness $t1s1$ in this embodiment is measured as a line passing through the circumferential centerline 124 of the openings and is the shortest distance between the adjacent openings 111 that define the column 30.

The columns 30 of the first set increase in thickness as they extend radially inwardly and outwardly from the $t1s1$ location. The columns 30 each have a radially outermost location. The portion of the column 30 having a thickness $t2s1$ is measured along a line that is tangent to the adjacent openings and is as close as possible to the radial outer extremes of adjacent openings. In the embodiment illustrated in FIG. 17, where the adjacent openings are of the same size and shape, the thickness is defined as the distance of the cord that intersects the arc that passes through the radial outermost extremes of the openings 14.

The columns 30 of the first set have a radial thickness $t3s1$ at a radially innermost portion of the column 30. Thickness $t3s1$ is measured in a manner analogous to that used to measure $t2s1$; thus, the radially innermost portion of the column 30 is located an arc that intersects the radially inner extremes of adjacent openings 14. The thickness $t3s1$ is defined as the distance of a cord that intersects the arc at the radially innermost extremes of the adjacent openings 14.

Figure 18:
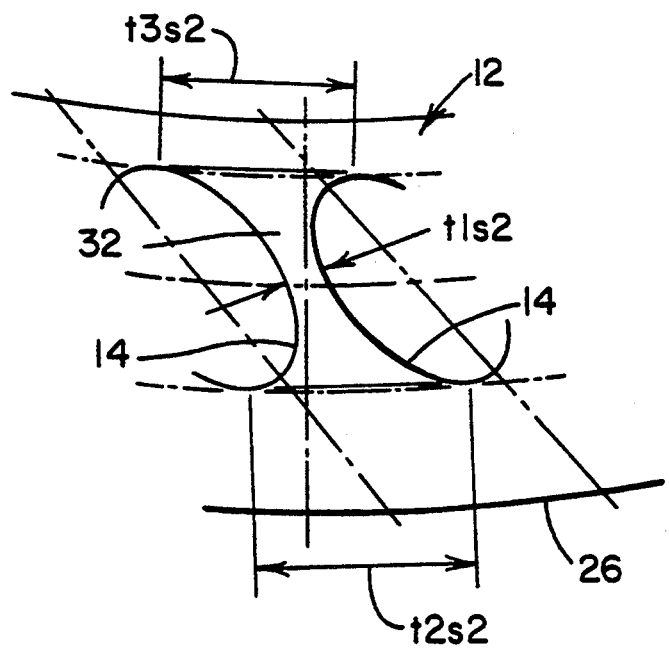
FIG. 18 is a schematic side view of the columns of the second set.

With regard to FIG. 18, a side view of some of the columns 32 of the second set formed by openings 14 in the embodiment of FIGS. 2–7 is illustrated. The columns 32 of the second set have a minimum cross-sectional thickness $t1s2$ located radially inwardly of the tread and radially outwardly of a radially innermost portion of the annular body 12. The thickness $t1s2$ is measured as a line passing through the radial centerline of the openings 14 and is the shortest distance between the openings 14 that define of the column 32.

The columns 32 of the second set increase in thickness as they extend radially inwardly and outwardly from the $t1s2$ location. The columns 32 have a thickness of $t2s2$ at a radially outermost location and have a thickness $t3s2$ at a radially innermost portion of the column 32. The thicknesses $t1s2$ and $t3s2$ of column 32 are defined in the same manner as the respectively corresponding thicknesses $t2s1$ and $t3s1$ of the column 30.

The columns 30 of the first set have ratios of $t2s1$ to $t1s1$ and of $t3s1$ to $t1s1$ both of which are at least 150%. Similarly the columns 32 of the second set also have ratios of $t2s2$ to $t1s2$ and of $t3s2$ to $t1s2$ both of which are at least 150%.

In the preferred embodiment, the cross-sections of the columns 30 of the first set are the same as those of the second set, the columns 32 of the second set being oppositely inclined with respect to the inclination of the first set of columns 30.

As illustrated in FIGS. 8 and 9, one embodiment of the present invention has the columns 30 of the first set intersecting the columns 32 of the second set when the respective cross-sections are overlaid, the intersection of columns being at least one location per column.

FIG. 6, one of the views of the preferred embodiment of the tire, illustrates the columns of one set intersecting columns of the opposite set at two locations. The first location of intersection is at about the radially innermost portion of a column and the second location of intersection located at about the radially outermost portion of a column.

As can be seen from FIGS. 6 and 7, the radially inner portion of each opening communicates with a radially inner portion of a circumferentially adjacent opening on the opposite side of the tire.

As illustrated in FIGS. 1–13, the openings comprise an elliptical curvature having a major and a minor axis. In the preferred embodiment the minor axis center is coincident with the center of the major axis. Alternatively, the minor axis can be offset from the midpoint of the major axis.

As illustrated in FIGS. 14–16, the openings may be egg like or ovate in shape in an alternative construction of the annular body. In this embodiment, the openings are inclined with ovate openings of the first set having an opposite inclination as compared to ovate openings of the second set. As illustrated in FIG. 16, if with respect to the adjacent openings the narrow end of the opening is alternated from a radially inward to a radially outward position, an increased number of columns can be used in an annular body than would be possible if the narrow end is directed inwardly as in FIG. 15 or outwardly as in FIG. 14.

In the preferred embodiment, for irregular or egg-shaped ovate openings, the openings taper downwardly as the opening extends axially inwardly. The tapering of the openings is as illustrated in FIGS. 11 and 12. Tapering facilitates the molding process.

The elliptical shape of the openings should have a ratio of major to minor axis greater than 1:1 for ride comfort and their major axis, on opposite sides of the tire, must be of opposite inclination as was previously mentioned.

In the preferred embodiment, the tread portion 26 comprises a first resilient material and the elastomeric body 12 comprises a second resilient material.

The annular body 12 is comprised of an elastomeric material which may have a Young's modulus E from about 21 to about 21,000 Kg/cm$^2$. For use as a temporary spare tire for passenger vehicles, it is preferred to use an elastomeric material having a Young's modulus E from about up to 421 Kg/cm$^2$ with a more preferred range being from 105 to less than 351 Kg/cm$^2$. The preferred tensile modulus at 300% is 161 Kg/cm$^2$ or 915.9 MPa's.

For example, E greater than 140 Kg/cm$^2$ may require a mixture of polyurethane and chopped fibers of an aromatic polyamide, for example, known under The Goodyear Tire & Rubber Company trademark Flexten TM. Alternatively it is believed that boron could be mixed with the polyurethane. One form of elastomeric material which is believed to be preferred especially for tires is polyurethane.

While the Shore A hardness may be between 60 and 100 for the body and 25 to 70 for the tread, it is preferred that the tread be in the range of 55 to 65 and the body in the range from 80 to 95 for passenger spare tires. The best tires evaluated to date had treads of about 63.5 Shore A hardness and bodies of about 87 Shore A hardness.

In the preferred embodiment the annular body is made from a Mobay's Baytec MS-061 urethane material. MS-061 is commercially available through Mobay Corporation, a Bayer U.S.A. Inc. The material is a MDI isocyanate terminated polyester. It exhibits a Shore hardness of 87A, a % NCO content of 6.8 and a 100 degree Celsius viscosity of 740 MPa.s.

The tread material can be made from any conventional compound used in passenger tires. In the embodiments tested the tread was made from a rubber blend. The blend consisted of natural rubber, SBR, and polybutadiene.

The rim could be made from steel, aluminum, or other metal alloys. Alternately it could be made from reinforced synthetic composite materials. In the embodiments tested, the rim was made from non-oriented fiber reinforced resinous composite materials; specifically, the rim material utilized was a glass reinforced vinyl ester. The resin comprised Ashland Resin D1222 vinyl Ester at 66.7% by weight and Snowflake's Carbofil Ca-CO$_3$ at 33.3% by weight. The resin was reinforced by Owens Corning "S" continuous strand glass part number M8810. The glass, having 0.3 Kg/meter$^2$ of weight, was added to the resin in a ratio of 35 pounds of glass per 45.4 Kg of resin. It is believed that improvements in the rim can be achieved by orienting the glass reinforcement.

The tire may be manufactured by several acceptable manufacturing processes. Specifically, the annular body may be molded in a mold utilizing liquid injection of the urethane from the bottom, or the urethane material can be poured into the mold from the top, thus filling the mold cavity, or thirdly the urethane may be added to a mold and spin cast to form the annular body.

The body can be molded directly onto the rim utilizing any of the three above-mentioned processes. Alternatively, the body can be adhesively fixed to the rim as a secondary operation. In either case, the rim must be solvently cleaned and an adhesive coating applied to the rim to ensure adequate bonding of the rim to the body of the tire.

In the molding of the annular body, the use of a silicone based mold release agent is recommended to facilitate extracting the molded part from the cavity.

After removing the body from the mold, a solvent washing of the part is required to remove the mold release agent.

The annular body is buffed along the surface to which the tread layer is to be mounted. After buffing the surface, a two component adhesive is applied. A first coating of Chemlock 219 adhesive is applied to the buffed surface of the annular body and a second coating of rubber adhesive Chemlock 250 is then overlaid.

After preparing the body with adhesive coatings, a green rubber strip of material is layered onto the prepared surface of the body, the unvulcanized material to be formed into the tread of the tire after molding.

The assembly is placed in a conventional mold. The tire is cured at a temperature of about 149 degrees C. for one hour. The mold provides compression to the assembly and forms the tread which is vulcanized directly on the annular body.

The tire and rim assembly is then removed from the mold. A trimming and deflashing operation is performed.

The urethane body requires aging after manufacture. In the preferred embodiment the annular body is aged at 121° C. after curing and bonding the tread to the tire assembly.

An alternative method of manufacture of the urethane body simplifies the manufacturing process.

In an alternative method of manufacture, a rim and a prepared precured tread are placed into the mold for forming the annular body. The body material is injected into the cavity, thus bonding directly to the tread and the rim.

The complete tire assembly is removed from the mold and deflashed and trimmed. The tire assembly is then aged at 121° C. for 12 hours. After aging the tire is ready for use.

In the tested embodiment of the tire 10, the surface of the composite rim was sand blasted then treated with a coat of Chemlock 607 primer, followed by a coat of Chemlock 213 urethane adhesive.

The rim was placed in the mold and the annular body 12 was formed by injection of urethane into the cavity. The urethane used in this currently preferred embodiment was Mobay's Baytec MS-061.

The rim and body assembly was removed from the mold and aged at 121° C. for 12 hours.

The surface of the urethane structure was washed with a chlorinated solvent (1,1,1-trichlorothane known by the trade name Chloroethene) to remove the mold release agent, buffed and then treated with a coat of Chemlock 219 urethane adhesive. After suitable drying, a coat of Chemlock 250 rubber adhesive was applied and a green rubber tread compound, including styrene butadiene rubber and polybutadiene rubber polymers, was layered onto the structure. The assembly was then placed into a conventional mold and cured at 300° F. for one hour.

Upon removal from the mold, the finished tire and rim assembly was trimmed and deflashed and post cure aged at 121° C. for 12 hours.

The invention described herein was evaluated utilizing finite element analysis as well as actual physical tests.

Finite element analysis (FEA) predicted the performance of the tire based on various geometric sizes of elliptical openings and resulting columns of the tire's annular body. In order to optimize the tire response as a function of the elliptical hole shape, certain constraints had to be taken into consideration. The "X" configuration annular body of the tire with the centers of the openings of the first and second sets being aligned was tested. In the FEA study, total polyurethane volume (V) and the major axis length was fixed, which meant that only the minor axis length (2a) (2b) and total number of ellipses (N) could be changed. The relationship among a, b, N, and other geometric parameters were derived as follows:

The polyurethane volume (V) was expressed as $$V = \pi(R_o^2 - R_i^2)t - N\pi ab\, t \qquad (1)$$

where $R_o$ and $R_i$ are the outside and inside radius of the annular body 12 of FIGS. 1 through 9, respectively, and t represents the width of the annular body in the axial direction.

Thus, b can be rewritten from Equation (1) and is given as $$b = \frac{1}{Na}\left\{ (R_o^2 - R_i^2) - \frac{V}{\pi t} \right\} \qquad (2)$$

where $R_o$, $R_i$, a, and V are
$R_o = 24.6$ cm (9.679 inch)
$R_i = 20.7$ cm (8.16 inch)
$a = 1.59$ cm (0.625 inch)
$t = 8.6$ cm (3.386 inch)
$v = 2681$ cm$^3$ (163.59 inch$^3$)

$$b = \frac{47.6 \text{ cm}}{N} \left( \frac{18.749 \text{ inch}}{N} \right) \qquad (3)$$

It should be noted that N must be an integer.

The study was conducted for openings of elliptical shape in which minor/major axis ratio was varied from 0.25 to 1.0 and the number of openings correspondingly was varied from 120 to 30 as shown in Table A.

TABLE A

| Elliptical Shape b/a | Number of Openings N | Angled Spacing of Centers |
|---|---|---|
| .25 | 120 | 3° |
| .5 | 60 | 6° |
| .6 | 50 | 7.2° |
| .75 | 40 | 9° |
| 1.0 | 30 | 12° |

As illustrated in Table B below, stresses are minimized as b/a increases.

TABLE B

Maximum values of stress when the annular body of the tires contact with a 1.7 meter (67) diameter drum surface. The contact force applied equaled 4,448 Newton.

| Tire body | Principal Stress Kg/cm² (psi) | Von Mises Stress Kg/cm² (psi) |
|---|---|---|
| N = 30, b/a = 1 | 8.35 ( 119) | 36.5 ( 520) |
| N = 40, b/a = 0.75 | 10.6 ( 151) | 54.2 ( 772) |
| N = 50, b/a = 0.6 | 19.4 ( 276) | 82.9 ( 1181) |
| N = 60, b/a = 0.5 | 22.5 ( 320) | 141.5 ( 2016) |
| N = 120, b/a = 0.25* | 431.3 (6144) | 1004 (14300) |

*Tire body is buckling, so the maximum contact force is only 1646 Newton (370 lbf)

Figure 19:
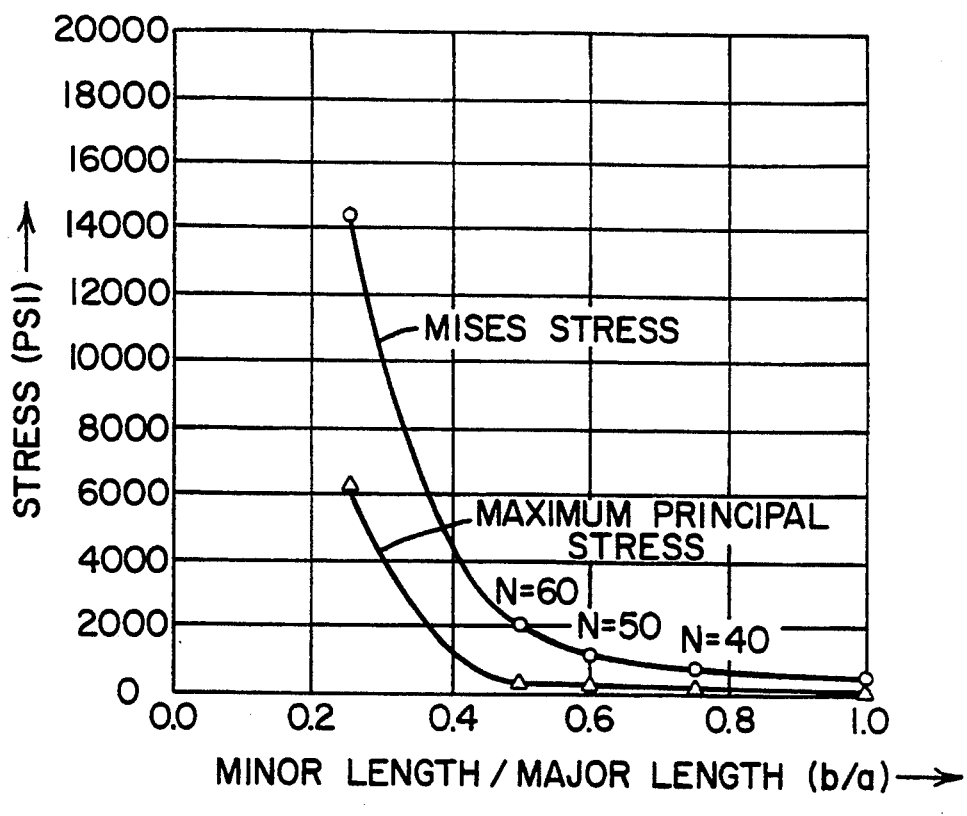
FIG. 19 is a chart of maximum stresses as a function of the elliptical shape of the opening where ($b/a = 0.25$ to 1).
Figure 20:
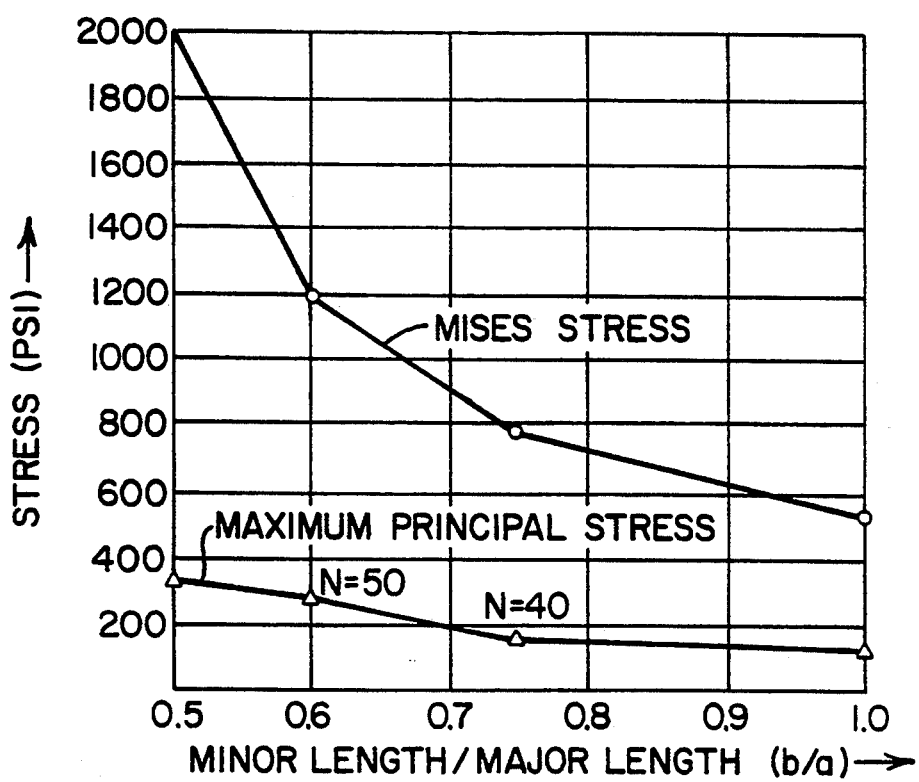
FIG. 20 is a chart of maximum stresses as a function of elliptical shape of the openings where ($b/a = 0.5$ to 1).

The maximum stresses as a function of ellipse shape are illustrated graphically in FIGS. 19 & 20. As can be seen, the stresses increase monotonically as a function of increasing N and decreasing b/a. The charts indicating that the range of b/a less than 0.5 (N=60) is not acceptable in view of maximum stress for the test tire body configuration described in Table A.

Figure 21:
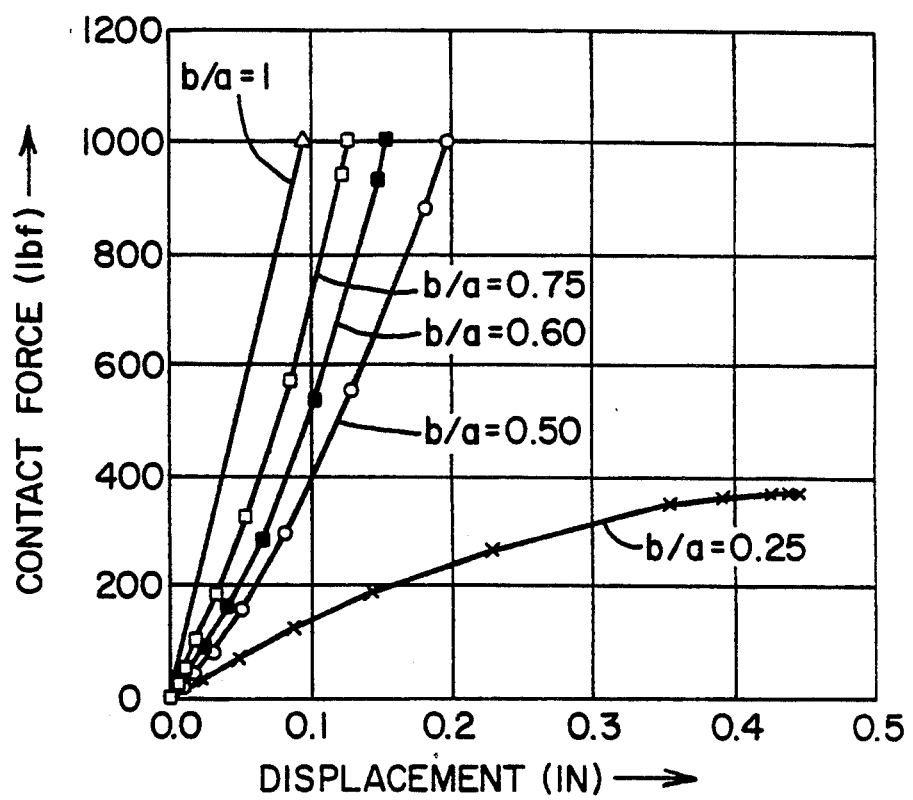
FIG. 21 is a plot of contact force versus surface displacement for elliptical openings where $b/a = 0.25, 0.50, 0.60, 0.75$ and $1.0$.

In order for the nonpneumatic tire to perform like a pneumatic tire, a suitable deflection under load must be achieved. It is believed that a minimum deflection of 0.25 cm under 453 Kg. load is required for acceptable ride and handling characteristics. As illustrated in FIG. 21, the suitable range of b/a is from 0.75 (N=40) to 0.5 (N=60).

Figure 22:
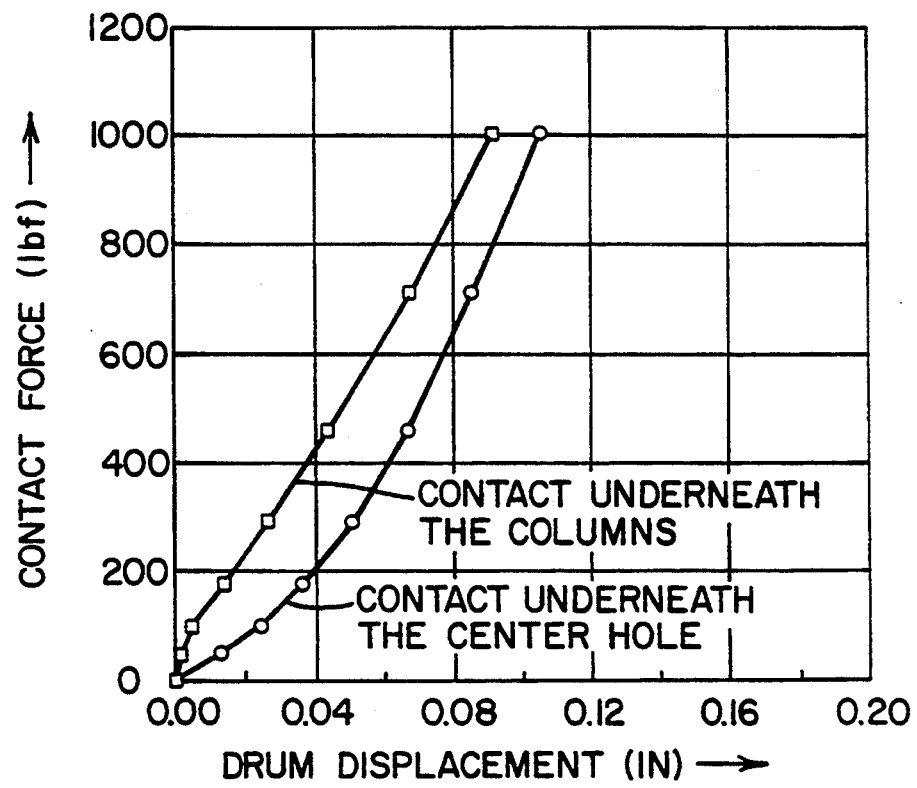
FIG. 22 is a plot of a contact force versus surface displacement where the openings are circular in shape ($b/a = 1$).
Figure 23:
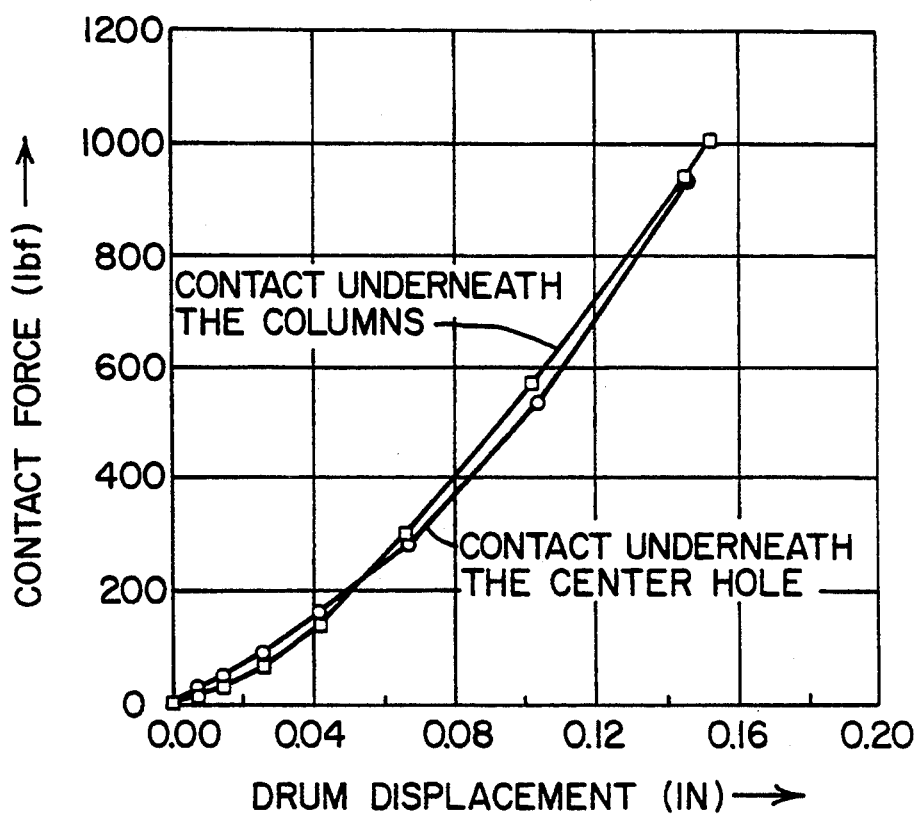
FIG. 23 is a plot of the contact force versus surface displacement where the openings are elliptical (with $b/a = 0.6$).
Figure 24:
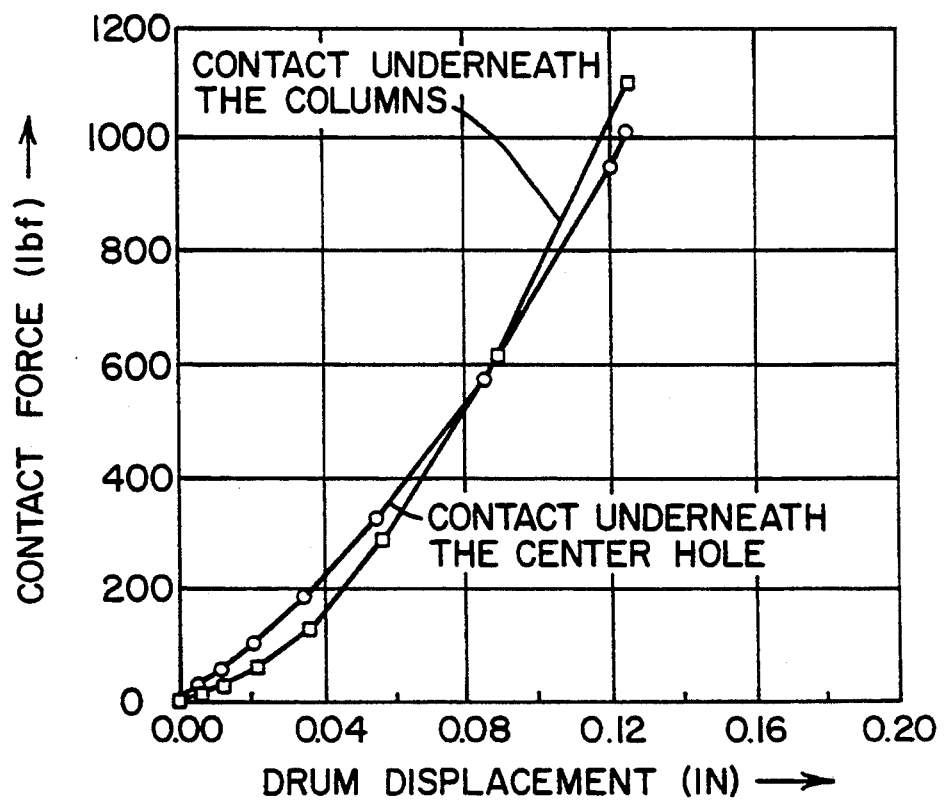
FIG. 24 is a plot of the contact force versus surface displacement where the openings are elliptical (with $b/a = 0.75$).

As the ratio of b/a increases, the number of columns decrease and the thickness of the columns increases. The tire body appears stiffer, generates higher contact force and exhibits a different load deflection curve dependent on whether the load is centered on a column or on an opening. The disparity of deflection is quite noticeable where b/a=0 (a circle) as illustrated in FIG. 22. Variations in deflection would result in reductions in ride comfort. Designs exhibiting the least variation would be desirable. Ideally, the curves should coincide. With reference to FIG. 23, where N=50, b/a=0.6, and FIG. 24 where N=40, b/a=0.75 variations in deflection as a function of load and column/opening position relative to load are minimized. The two defection curves in each figure are approximately coincident.

The finite element analysis viewed in light of acceptable minimum stresses and ride comfort indicate that the preferred range of b/a is 0.6 (N=50) to 0.75 (N=40) for the nonpneumatic tire described in Table A.

It should be understood the ranges of acceptable elliptically shaped openings and the number of each openings could be increased by changing the section height and the void to material ratio as well as other parameters.

Experimental studies of the "V" configuration embodiment were conducted wherein the centers of the openings were offset such that the openings communicated at radial extremes as illustrated in FIG. 11. Testing of tires having the configuration described below was conducted. In terms of ride and stresses, the tires performed acceptably. The acceptable maximum spring rates of the annular body is believed to be less than 702 Kg/cm². The "X" configuration test tire had a deflection of 0.84 cm@567 Kg load and the "V" configuration test tire had a deflection of 1.1 cm under the same load. This corresponds to spring rates of 675 Kg/cm. for the "X" tire and 507 Kg/cm. for the "V" tire. The "V" tire with a lower spring rate yields a softer side than the "X" tire.

Nonlinear 3-D finite elemental analyses were conducted on two distinct nonpneumatic tire body geometries illustrated in FIGS. 2 and 8. The distinguishing feature of the first design is that the columns meet at their tops and bottoms and are unsupported in the middle ("V" tire). The second geometry is a derivative of the first with the back half of the tire rotated with respect to the front half so that the forward and backside columns cross in the middle and support each other ("X" tire). Both the "X" and "V" tires' annular bodies had the same dimensional characteristics where $R_o = 24.6$ cm (9.676 inch), $R_i = 20.7$ cm (8.16 inch), $t = 8.6$ cm (3.386 inch), $v = 2681$ cm³ (163.59 inch³), N=50/side, b/a=0.75, and openings were spaced at 7.2°, and inclined at 45°.

1. When considering the possibility of a Mode I type failure (principal stresses), neither design appears to have an advantage but the "X" design is superior with respect to minimizing the shearing deformation (strain energy density) in the tire for normal road conditions (Table I).

TABLE I

Maximum Values of Stress and Strain
Contact with a Flat Surface (Displ = 0.76 cm (0.3"))

|  | Principal Stress Kg/cm² (psi) | Von Mises Stress Kg/cm² (psi) | Strain Energy Density Kg/cm² (psi) |
|---|---|---|---|
| V-tire | 23.9 (340) | 103 (1427) | 25.5 (363) |
| X-tire | 24.5 (349) | 83 (1185) | 17.3 (247) |

2. Simulations of pothole events indicate that the "V" design to be clearly superior since the maximum stresses and strains for this tire are considerably less than they are for the "X" tire (Table II).

TABLE II

Maximum Values of Stress and Strain
Contact with a Pothole (Displ = 1.5 cm (0.6"))

|  | Principal Stress Kg/cm² (psi) | Von Mises Stress Kg/cm² (psi) | Strain Energy Density Kg/cm² (psi) |
|---|---|---|---|
| V-tire* | 88 (1252) | 165 (2344) | 46 ( 657) |
| X-tire** | 112 (1601) | 262 (3734) | 109 (1548) |
| X-tire*** | 68 ( 975) | 119 (1701) | 34 ( 478) |

It is believed that the inclination of the openings could vary within a range of 15° to 75° with acceptable tire performance.

In view of the foregoing description of the invention, it will be apparent that various changes and modifications may be made in the subject matter disclosed without departure from the spirit and scope of the invention.

What is claimed is:

1. An improved nonpneumatic tire of the type having a rim and one or more elastomeric materials bonded to the rim or to one another, the tire having an equatorial plane, an axis perpendicular to the equatorial plane, an annular tread rotatable about the axis, an annular elastomeric body made from a material having a Shore A hardness in the range of 60 to 100, the body having first and second spaced lateral sides equidistant from the equatorial plane and extending between the tread and the rim, the body having at least 48 openings positioned equidistant from the axis, at least 24 of which extend from the first side and at least 24 of which extend from the second side to form first and second sets of openings extending from the respective sides toward the equatorial plane, the openings forming equally-spaced columns of elastomeric material in the body, the columns formed by the first set of openings being generally inclined to the radial direction of the tire, the columns formed by the second set of openings being generally inclined to the radial direction of the tire but opposite in inclination with respect to the columns formed by the first set of openings, the improved tire being characterized by:

the columns of the first and second set sets having respective cross-sections, the cross-sections of the columns of the first set having a minimum thickness $t1s1$ located radially inwardly of the tread and radially outwardly of a radially innermost portion of the annular body, $t1s1$ being measured as a line passing through the circumferential centerline of the openings and being the shortest distance between adjacent openings of the first set, the thickness of the columns of the first set increasing as they extend radially outwardly from the minimum thickness $t1s1$ to a maximum radially outer thickness $t2s1$ at a radially outermost portion of the columns of the first set, $t2s1$ being measured along a line that is tangent to the radially outer extremes of adjacent openings, and the thickness of the columns of the first set increasing as they extend radially inwardly from the minimum thickness $t1s1$ to a maximum radially inner thickness $t3s1$ at a radially innermost portion of the column as measured along a line that is tangent to the radially inner extremes of adjacent openings, and the ratio of $t2s1$ to $t1s1$ and the ratio of $t3s1$ to $t1s1$ both being at least 150% in the cross-section, the cross-section of the columns of the second set having a minimum thickness $t1s2$ located radially inwardly of the tread and radially outwardly of a radially innermost portion of the annular body, $t1s2$ being measured as a line passing through the circumferential centerline of the openings and being the shortest distance between adjacent openings of the second set, the thickness of the columns of the second set increasing as they extend radially outwardly from the minimum thickness $t1s2$ to a maximum radially outer thickness $t2s2$ at a radially outermost portion of the columns of the second set, $t2s2$ being measured along a line that is tangent to the radially outer extremes of adjacent openings, and the thickness of the columns of the second set increasing as they extend radially inwardly from the minimum thickness $t1s2$ to a maximum radially inner thickness $t3s2$ at a radially innermost portion of the column as measured along a line tangent to the radially inner extremes of adjacent openings and the ratio of $t2s2$ to $t1s2$ and the ratio of $t3s2$ to $t1s2$ both being at least 150% in the cross-section and wherein the openings of the first set communicate with the openings of the second set, the openings taper downwardly as the openings extend axially inwardly, the openings having a maximum size at a side of the tire.

2. The tire of claim 1, wherein the columns of the first set intersect the columns of the second set when the respective cross-sections are overlaid, the intersection of columns being at at least one location per column.

3. The tire of claim 2, wherein the intersection of columns is located closer to the radially inner portion of the columns of both sets than to the radially outermost portion of the columns.

4. The tire of claim 2, wherein each of the columns of one set intersect columns of the opposite set at only two locations, the first intersection being located at about the radially innermost portion of a column and the second intersection being located at about the radially outermost portion of a column.

5. The tire of claim 1, wherein the columns formed by the first set of openings intersect the columns formed by the second set of openings at locations other than in the equatorial plane of the tire.

6. The tire of claim 2, wherein the columns formed by the first set of openings intersect the columns formed by the second set of openings at locations other than in the equatorial plane of the tire.

7. The tire of claim 3, wherein the columns formed by the first set of openings intersect the columns formed by the second set of openings at locations other than in the equatorial plane of the tire.

8. The tire of claim 4, wherein the columns formed by the first set of openings intersect the columns formed by the second set of openings at locations other than in the equatorial plane of the tire.

9. The tire of claim 1, each of the openings comprising an elliptical curvature having a major and minor axis.

10. The tire of claim 2, each of the openings comprising an elliptical curvature having a major and minor axis.

11. The tire of claim 3, each of the openings comprising an elliptical curvature having a major and minor axis.

12. The tire of claim 4, each of the openings comprising an elliptical curvature having a major and minor axis.

13. The tire of claim 5, each of the openings comprising an elliptical curvature having a major and minor axis.

14. The tire of claim 9 wherein the minor axis is offset from the midpoint of the major axis.

15. The tire of claim 12 each of the openings comprising an oval curvature.

16. The tire of claim 1 each of the openings comprising an oval curvature.

17. The tire of claim 14 having a ratio of major axis to minor axis greater than 1:1.

18. The tire of claim 1 wherein the tread portion comprises a first resilient material and the elastomeric body comprises a second resilient material.

19. The tire of claim 1, wherein each opening of the first set communicates with an opening of the second set at a radially inner portion of the openings.

20. The tire of claim 19, wherein each opening of the first set communicates with a pair of openings of the second set.

21. The tire of claim 20, wherein each opening of the second set communicates with a pair of openings from the first set.

* * * * *